(No Model.)
G. W. PRIOR.
SHAFT ATTACHMENT FOR VEHICLES.
No. 287,468. Patented Oct. 30, 1883.
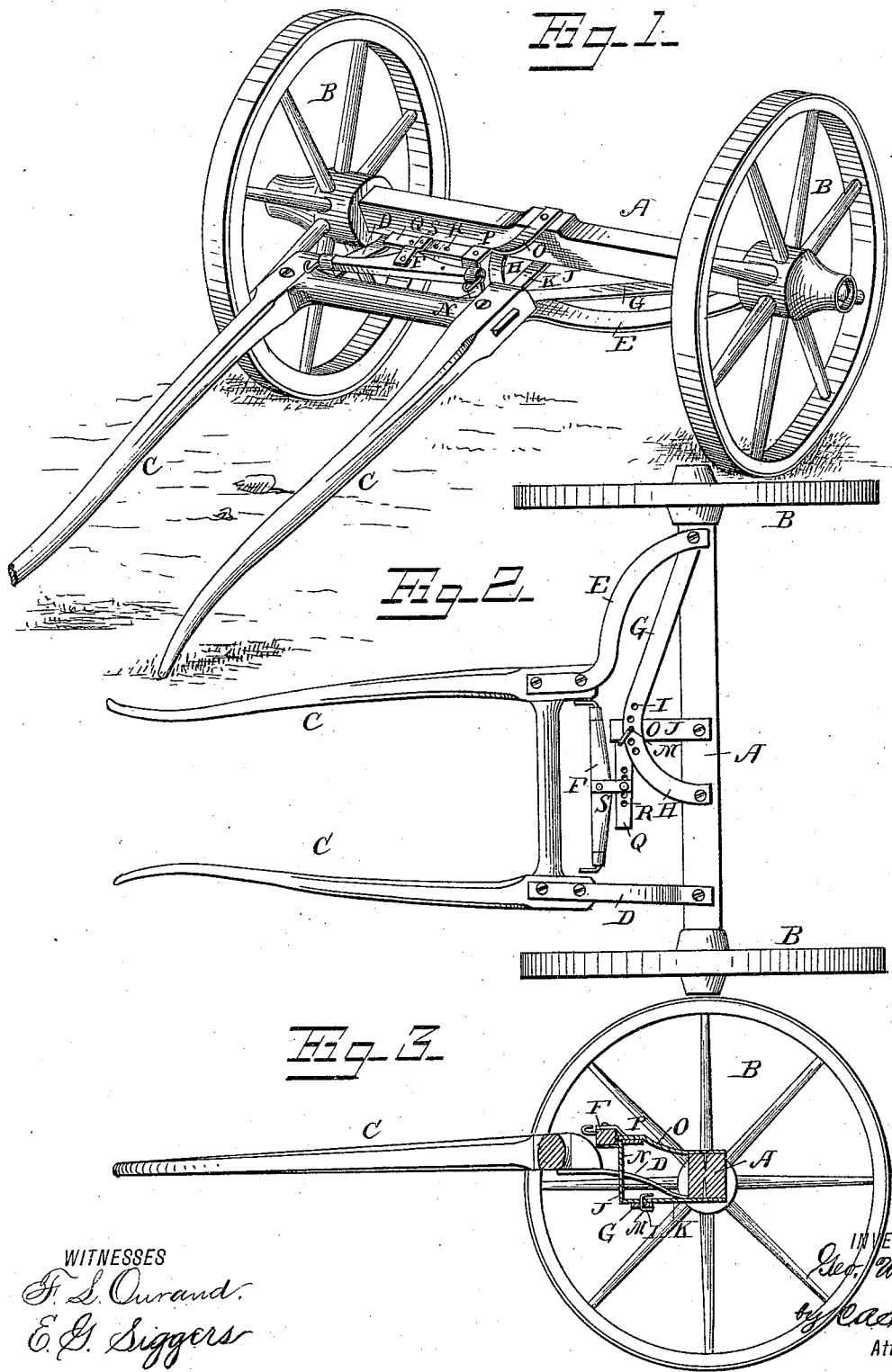
WITNESSES
INVENTOR

UNITED STATES PATENT OFFICE.

GEORGE W. PRIOR, OF BOEGER'S STORE, MISSOURI.

SHAFT ATTACHMENT FOR VEHICLES.

SPECIFICATION forming part of Letters Patent No. 287,468, dated October 30, 1883.

Application filed July 16, 1883. (No model.)

*To all whom it may concern:*

Be it known that I, GEORGE W. PRIOR, a citizen of the United States, residing at Boeger's Store, in the county of Osage and State of Missouri, have invented a new and useful Shaft Attachment for Vehicles, of which the following is a specification, reference being had to the accompanying drawings.

This invention relates to attaching shafts to vehicles; and its object is to provide means possessing superior advantages in point of simplicity, inexpensiveness, durability, and general efficiency, whereby the shafts are arranged at one side the vehicle to obviate the necessity of the horse walking on the ridge common in the center of roads, and whereby the draft from the whiffletree will be equalized.

In the drawings, Figure 1 is a perspective view, illustrating my invention applied to a sulky. Fig. 2 is a bottom view of the same. Fig. 3 is a vertical longitudinal sectional view.

Referring to the drawings, A designates the axle of the vehicle, and B B are the wheels journaled thereon.

C C are the thills, which may be of any suitable construction, and are arranged at one side of the vehicle, away from the center of the latter. To effect this arrangement of the thills, one thill-iron, D, is straight, and is connected with the axle A at the side nearest the wheel, while the other thill-iron, E, is bent or curved outwardly and rearwardly from the thill, as shown, and is also connected to the axle near the wheel. By this arrangement it will be seen that the thills are centrally connected with the axle, both thill-irons being connected to the axle at points a corresponding distance from the wheels at their respective sides, but, by reason of the curved thill-iron, are disposed at one side of the vehicle, and not on a central line.

The whiffletree F is arranged in relation to the position of the thills as follows: A plate, G, projects centrally and forwardly from the point where the curved iron E is connected with the axle to a plane passing centrally through the axle, from whence it is curved rearwardly and inwardly, as shown at H, and is secured to the axle at the other side of its center, this plate being provided with a series of perforations, I, at the vertex of its angle.

J is a bracket, which is pivoted to the axle at its center, and comprises a forwardly-projecting bottom arm, K, having a perforation, L, through which a pin, M, is passed and adjusted in any one of the series of perforations I, a perpendicular front portion, N, and a rearwardly-extending top plate, O, these plates K and O being pivoted, respectively, to the bottom and top of axle A. By curving plate O upward, as shown at P, the whiffletree will be given the desired elevation in relation to the thills. An arm, Q, projects laterally from the plate O at its front end, and is provided with a series of perforations, R, in any one of which the whiffletree is pivoted, as shown at S.

The operation and advantages of my invention will be readily understood. The horse can walk at the side of the vehicle, while the draft is equalized and will be from the center.

My invention is adapted for application to all kinds of vehicles, and when applied to four-wheel carriages or wagons the thills will be pivotally coupled to the front axle in the usual manner.

I claim as my invention—

1. The combination, with the axle of the vehicle, having the thills disposed at one side, of the bracket pivoted centrally to the axle, and provided with the laterally-projecting arm, and the whiffletree attached to this arm, so that it will be centrally arranged in relation to the thills, substantially as and for the purpose set forth.

2. The combination, with the axle of the vehicle, having the thills arranged at one side, of the plate G, projecting from the under side of the axle forwardly to the center, and then curved rearwardly, and provided with the series of perforations I, the bracket J, comprising the forwardly-projecting arms K and O, pivoted to the bottom and top of the axle, and united at their front ends by the perpendicular portion N, the pin M, for adjusting the position of the bracket, the lateral arm Q, projecting from the top of the bracket, and provided with the series of perforations R, and the whiffletree, connected to the said arm by means of these perforations, substantially as and for the purpose set forth.

In testimony that I claim the foregoing as my own I have hereto affixed my signature in presence of two witnesses.

GEORGE WASHINGTON PRIOR.

Witnesses:
 R. STEELE ROGERS,
 F. S. BENSON.